(12) United States Patent
Gordon et al.

(10) Patent No.: US 11,777,931 B2
(45) Date of Patent: Oct. 3, 2023

(54) SYSTEMS AND METHODS FOR AUTHORIZING ACCESS TO A COMPONENT IN AN ELECTRIC POWER DISTRIBUTION SYSTEM

(71) Applicant: Schweitzer Engineering Laboratories, Inc., Pullman, WA (US)

(72) Inventors: Colin Gordon, Katy, TX (US); Dennis Gammel, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 335 days.

(21) Appl. No.: 17/065,940

(22) Filed: Oct. 8, 2020

(65) Prior Publication Data
US 2022/0116391 A1  Apr. 14, 2022

(51) Int. Cl.
*H04L 29/06* (2006.01)
*H04L 9/40* (2022.01)

(52) U.S. Cl.
CPC ...... *H04L 63/0876* (2013.01); *H04L 63/0485* (2013.01); *H04L 2463/041* (2013.01)

(58) Field of Classification Search
CPC ............. H04L 63/0876; H04L 63/0485; H04L 2463/041
See application file for complete search history.

(56) References Cited

U.S. PATENT DOCUMENTS

| | | | |
|---|---|---|---|
| 7,729,276 B2 | 6/2010 | Akyol | |
| 2012/0266209 A1* | 10/2012 | Gooding | H04L 63/20 726/1 |
| 2019/0116183 A1 | 4/2019 | Hussain | |
| 2019/0173860 A1 | 6/2019 | Sankaran | |
| 2019/0260204 A1* | 8/2019 | Koval | G06Q 30/0206 |
| 2019/0342101 A1 | 11/2019 | Hayes | |
| 2020/0106719 A1 | 4/2020 | Acharya | |
| 2020/0379947 A1* | 12/2020 | Kagan | G01D 4/004 |
| 2021/0067329 A1* | 3/2021 | Coyle | H04L 9/0891 |

* cited by examiner

*Primary Examiner* — Evans Desrosiers
(74) *Attorney, Agent, or Firm* — Fletcher Yoder, P.C.

(57) ABSTRACT

A system includes an intelligent electronic device (IED) and a proxy device communicatively coupled to the TED via a Media Access Control (MACsec) communication link. The proxy device is configured to perform operations that include receiving permissions data, receiving a request to perform an action associated with the TED, determining whether the action is authorized based on the permissions data, and transmitting data to the TED via the MACsec communication link in response to determining that the action is authorized.

20 Claims, 5 Drawing Sheets

SYSTEMS AND METHODS FOR AUTHORIZING ACCESS TO A COMPONENT IN AN ELECTRIC POWER DISTRIBUTION SYSTEM

BACKGROUND

This disclosure relates to authenticating a user to authorize the user to control different components of an electric power distribution system via Media Access Control security (MACsec).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system during operation of the electric power distribution system. For example, the IED may receive and/or transmit a signal and/or data in order to perform a function, such as to cut power to part of the electric power distribution system in the event of a fault. Indeed, the IED may enable a user to control operation of various components of the electric power distribution system more easily, such as via a remote device. Unfortunately, it may be difficult to authorize different users to perform different actions with respect to the electric power distribution system, such as to authorize a user to control a set of components of the electric power distribution system.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a system includes an intelligent electronic device (IED) and a proxy device communicatively coupled to the IED via a Media Access Control (MACsec) communication link. The proxy device is configured to perform operations that include receiving permissions data, receiving a request to perform an action associated with the IED, determining whether the action is authorized based on the permissions data, and transmitting data to the IED via the MACsec communication link in response to determining that the action is authorized.

In an embodiment, a proxy device for an electric power distribution system includes processing circuitry and a memory that stores instructions. The instructions, when executed by the processing circuitry, are configured to cause the processing circuitry to perform operations that include receiving first permissions data associated with a first user from a first computing device, receiving second permissions data associated with a second user from a second computing device, receiving first data from the first computing device, in which the first data includes performing a first action associated with an IED of the electric power distribution system, processing the first data based on the first permissions data to determine that the first action is authorized, and transmitting second data to the IED via a MACsec communication link in response to determining that the first action is authorized. The instructions, when executed by the processing circuitry, are also configured to cause the processing circuitry to perform operations that include receiving third data from the second computing device, in which the third data includes performing a second action associated with the IED of the electric power distribution system, processing the third data based on the second permissions data to determine that the second action is not authorized, and blocking the second action from being performed in response to determining that the second action is not authorized.

In an embodiment, a system includes a plurality of intelligent electronic devices (IEDs) and a proxy device communicatively coupled to each IED of the plurality of IEDs via a respective Media Access Control (MACsec) communication link. The proxy device is configured to perform operations that includes receiving permissions data, processing the permissions data to map a plurality of allowable behavior functions to the permissions data, receiving a request to perform an action associated with an IED of the plurality of IEDs, determining whether the action is authorized based on the plurality of allowable behavior functions mapped to the permissions data, and transmitting data to the IED via a corresponding MACsec communication link in response to determining that the action is authorized.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Furthermore, some depictions of logic circuitry have been described via this disclosure. It should be noted that logically equivalent circuitry may be used herein to implement the systems and methods described. For example, a logical XOR gate may be replaced via a logically equivalent combination of NOT gates, AND gates, Inverse NOT gates, OR gates, NAND gates, NOR gates, or the like.

Embodiments of the present disclosure are directed to authorizing a user to perform actions associated with components of an electric power distribution system. Intelligent electronic devices (IEDs) may be used to control certain devices and to perform certain operations of the electric power distribution system. For example, an IED may be a relay that enables or blocks electrical power to flow between other components of the electric power distribution system. The IED may, for instance, receive a control signal from a computing device (e.g., based on a user input), and the IED may operate based on the control signal. Furthermore, the IED may transmit data, such as operating information, to the computing device to enable visualization of the operation of the electric power distribution system and/or to transmit data to other components of the electric power distribution system to control operation of the other components. In this way, the IED may enable greater control over certain aspects of the electric power distribution system.

In some circumstances, it may be desirable to securely control the data that may be transmitted between the computing device and certain IEDs of the electric power distribution system. For example, a particular user may be authorized to control a first set of IEDs and not a second set of IEDs, and/or the user may be authorized to request a first set of actions associated with the IEDs to be performed and not to request a second set of actions associated with the IEDs to be performed. Accordingly, the techniques described herein include implementing a proxy device that is communicatively coupled to the IEDs and to the computing device to control the flow of data. That is, the proxy device may selectively enable or block data transmission between the IEDs and/or between any of the IEDs and the computing device. To this end, the proxy device may receive permissions data (e.g., an authentication token) associated with a user. The proxy device may process the permissions data to map a set of authorized IEDs and/or a set of authorized actions with the permissions data. The proxy device may then receive data from the computing device in which the data is indicative of an action associated with one of the IEDs. In response, the proxy device may determine whether the action is authorized based on the processing of the permissions data. Indeed, the proxy device may communicate subsequent data with the IED (e.g., to perform the action) via a MACsec communication link in response to a determination that the action is authorized, and the proxy device may not communicate subsequent data with the IED via the MACsec communication link in response to a determination that the action is not authorized. In this manner, the proxy device may enable or block actions to be performed based on the permissions data without the IED having to process the permissions data.

Figure 1:
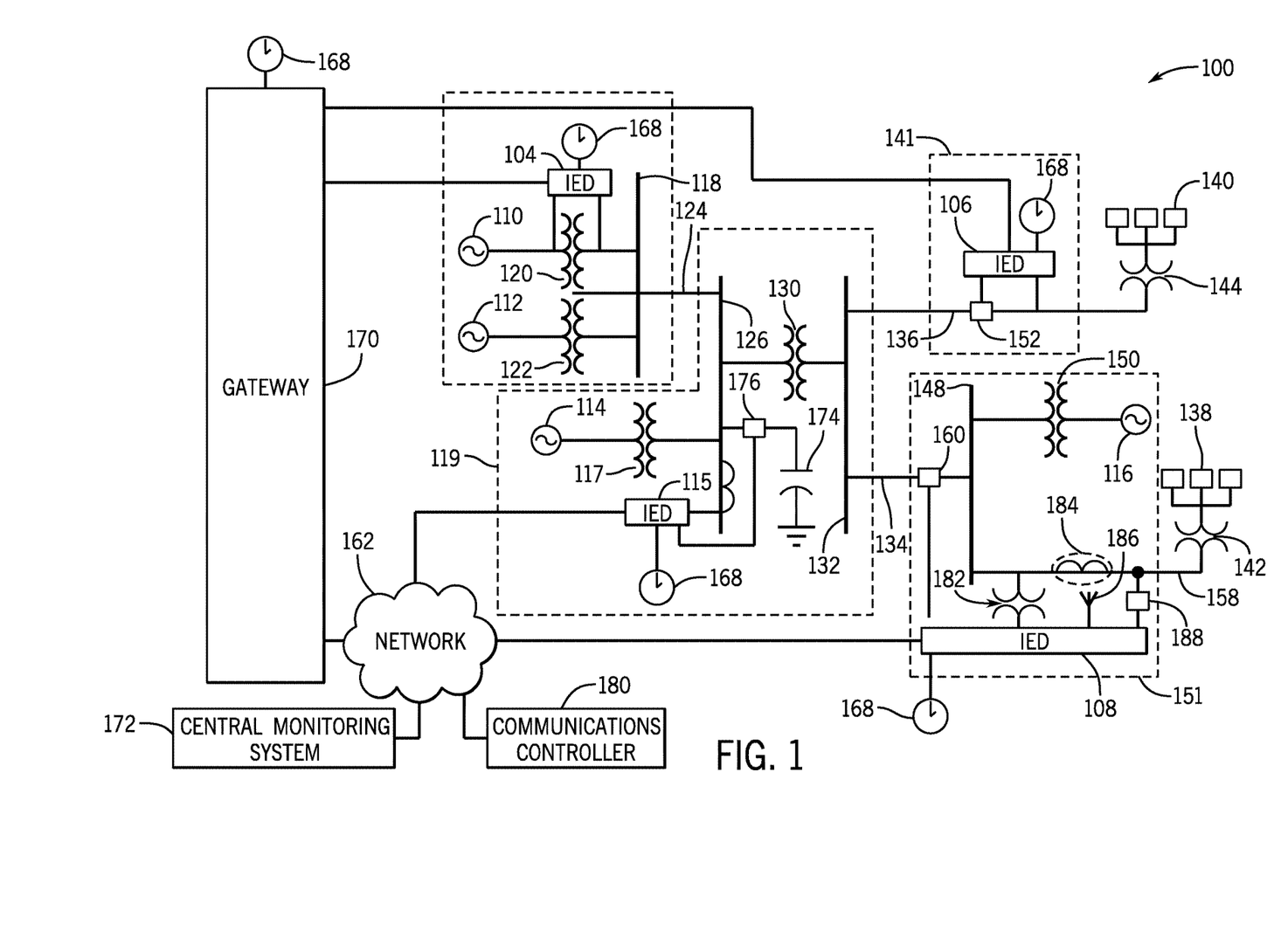
FIG. 1 is a schematic diagram of an embodiment of an electric power distribution system, in accordance with an embodiment of the present disclosure.

Turning now to the drawings, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

The electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in the electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A gateway 170, such as a network gateway, may be in communication with the IEDs 104, 106, 108, 115. The IEDs 104, 106, 108, 115 may be remote from the gateway 170 and may communicate over various media. For instance, the gateway 170 may be directly in communication with the IEDs 104, 106 and may be in communication with the IEDs 108, 115 via the communications network 162. The gateway 170 may enable or block data flow between any of the IEDs 104, 106, 108, 115 and another component communicatively coupled to the gateway 170, such as a computing device to enable a user (e.g., a technician, an operator) to control operation of one of the IEDs 104, 106, 108, 115. Moreover, the gateway 170 may enable or block data flow among any of the IEDs 104, 106, 108, 115. For example, the IED 106 may receive data (e.g., from the IED 104, from a computing device) and, in response, may transmit corresponding data to the IED 108.

In some embodiments, the gateway 170 may communicate with the IEDs 104, 106, 108, 115 via a Media Access Control security (MACsec) communication link that is configured by a MACsec Key Agreement (MKA) Connectivity Association. The MACsec communication link may be established between a first component (e.g., the gateway 170) and a second component (e.g., one of the IEDs 104, 106, 108, 115) based on verified possessions of a copy of the same MKA connectivity association key (CAK). For example, one of the first or the second component (e.g., the gateway 170) may distribute a copy of the CAK to the other of the first or the second component, and/or a third component may distribute copies of the CAK to both the first component and the second component. Upon verification of the possession of the same CAK, identical copies of a MACsec secure association key (SAK) may be securely distributed to the first and the second components via MKA by way of a Key Encrypting Key (KEK) derived from the CAK. Each component may then use the SAK to encrypt data to be transferred to the other component as part of a MACsec communication link, and each component may also use the SAK to decrypt encrypted data received from the other component. As such, MKA and MACsec enable the components to transfer encrypted data to one another for secure communication. Although the present disclosure primarily discusses the use of MKA and MACsec communication links, any other suitable communication techniques may be used to enable data transfer between components of the electric power distribution system 100.

A communications controller 180 may interface with equipment in the communications network 162 to create a software-defined network (SDN) that facilitates communication between the gateway 170, the IEDs 108, 115, and/or the central monitoring system 172. In various embodiments, the communications controller 180 may interface with a control plane (not shown) in the communications network 162. Using the control plane, the communications controller 180 may direct the flow of data within the communications network 162.

Figure 2:
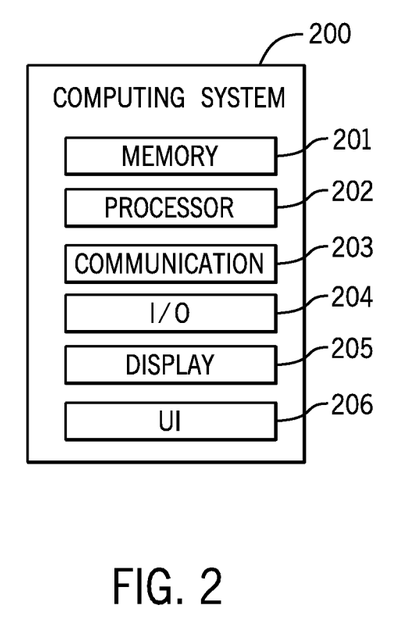
FIG. 2 is a schematic diagram of an embodiment of a computing system that may be incorporated in a component of an electric power distribution system, in accordance with an embodiment of the present disclosure.

FIG. 2 is a schematic diagram of an embodiment of a computing system 200 that may be incorporated within a component of the electric power distribution system 100, such as in any of the IEDs 104, 106, 108, 115, in the gateway 170, and/or in any other suitable component described in the present disclosure. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the gateway 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the gateway 170 may communicatively couple to corresponding I/O ports 204 of the computing system 200 of a computing device. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 to transmit data to one of the IEDs 104, 106, 108, 115.

As discussed above, it may be time-consuming, complex, or otherwise difficult to implement a system that authorizes and enables different users to perform different actions in a context of the electric power distribution system 100. For example, in conventional approaches, certain permissions data (e.g., a token) associated with a particular user may be processed to enable the user to perform certain actions but not other actions. However, it may be difficult to manufacture and/or modify each of the IEDs 104, 106, 108, 115 to be able to process the permissions data and to enable the user to perform corresponding actions based on the permissions data while also performing their primary functions to operate in the electric power distribution system 100.

Figure 3:
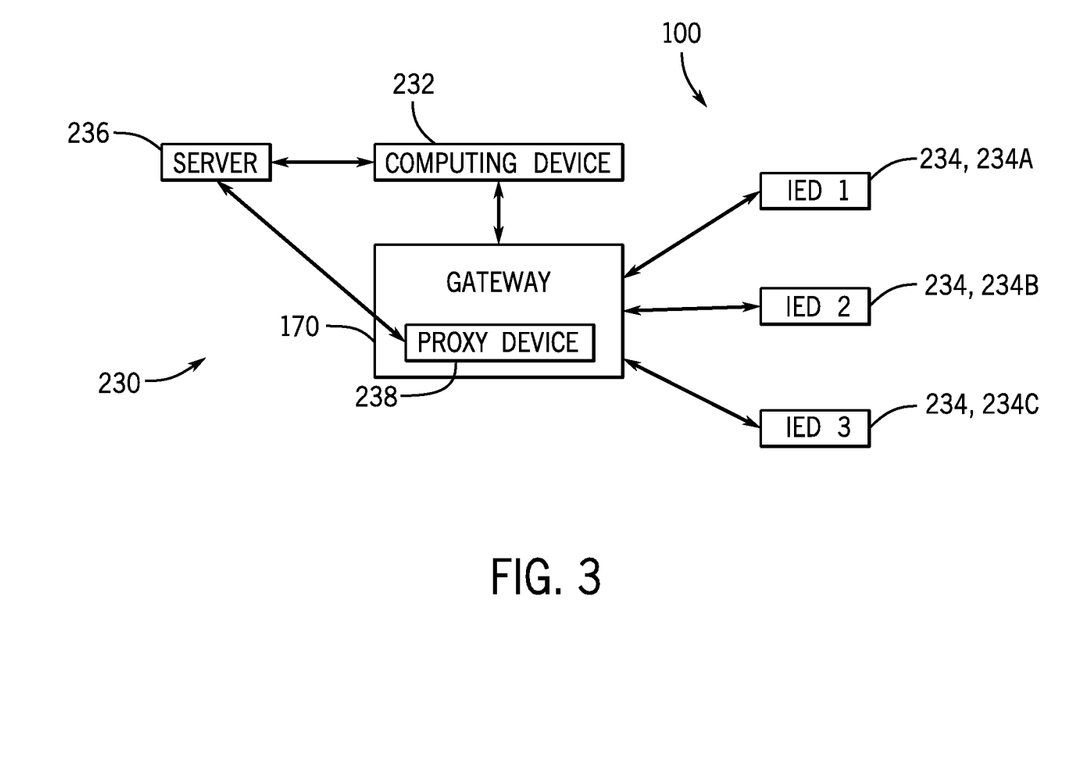
FIG. 3 is a schematic diagram of an embodiment of a network for communicating with intelligent electronic devices (IEDs) of an electric power distribution system, in accordance with an embodiment of the present disclosure.

With this in mind, FIG. 3 is a schematic diagram of an embodiment of a network 230 that enables a user (e.g., a technician, an operator) to communicate with various components (e.g., IEDs) of the electric power distribution system 100 based on permissions data associated with the user. As an example, the user may utilize a computing device 232, such as a laptop, a mobile phone, a desktop, a tablet, or another suitable device to receive data, such as operating data, from the electric power distribution system 100 and/or to transmit data, such as a user input, to the electric power distribution system 100. In the illustrated embodiment, the computing device 232 is communicatively coupled to the gateway 170, which enables or blocks data transfer between IEDs 234 of the electric power distribution system 100 and between the computing device 232 and any of the IEDs 234.

Indeed, the gateway 170 may relay data received from the computing device 232 to a corresponding IED 234, and/or the gateway 170 may block data received from the computing device 232 from being transmitted to any of the IEDs 234. Similarly, the gateway 170 may relay data received from any of the IEDs 234 to the computing device 232, and/or the gateway 170 may block data received from any of the IEDs 234 from being transmitted to the computing device 232.

For instance, the gateway 170 may enable and/or block certain data from being transmitted based on received permissions data (e.g., a token). That is, the user of the computing device 232 may have particular permissions rights that enable certain communications between the computing device 232 with a set of the IEDs 234. As an example, a first user (e.g., a junior level user) may be able to use the computing device 232 to communicate with a first IED 234A, but the first user may not be able to use the computing device 232 to transmit data with a second IED 234B or a third IED 234C. Further, a second user (e.g., a senior level user) may be able to use the computing device 232 to communicate with each of the first IED 234A, the second IED 234B, and the third IED 234C. For this reason, the permissions data may therefore be uniquely associated with the user of the computing device 232 (e.g., based on user credentials or user identifiers associated with the user) to enable the gateway 170 to enable and block corresponding communication between the computing device 232 and the IEDs 234. Additionally or alternatively, the gateway 170 may enable and/or block certain types of data to be transferred between the IEDs 234 and the computing device 232 based on the permissions data. By way of example, a first user may be able to request for data from the first IED 234A but not to control an operation of the first IED 234A, and a second user may be able to control an operation of the first IED 234A but not to request for data from the first IED 234A. In this manner, the gateway 170 may enable particular types of data to be transmitted between the computing device 232 and a particular set of the IEDs 234 based on the permissions data.

In some embodiments, the permissions data may be received from the computing device 232. By way of example, the network 230 may use token-based authentication as the permissions data, and the computing device may communicate with a server 236 to obtain an authentication token from the server 236. The authentication token may include a list of rights, such as allowable actions that can be performed based on a user input as well as data that can be viewed by the user. Indeed, the authentication token retrieved from the server 236 may be specifically associated with the user. For instance, the user may utilize the computing device 232 to transmit user credentials (e.g., a username and a password combination) to the server 236, the server 236 may generate a corresponding authentication token based on the user credentials, and the server 236 may transmit the authentication token to the computing device 232. The computing device 232 may then transmit the authentication token to the gateway 170 for enabling and blocking data transfer based on the authentication token. For example, the gateway 170 may include or be communicatively coupled to a proxy device 238 that may process the authentication token received from the computing device 232 and may accordingly enable data transfer via the gateway 170 based on the authentication token. Indeed, the proxy device 238 may map specific allowable actions to the user associated with the authentication token. In additional or alternative embodiments, other permissions data may be used to enable the computing device 232 to communicate with the IEDs 234. As an example, the proxy device 238 may receive permissions data from a source that is not associated with the computing device 232, such as from a device utilized by a remote user, to confirm the identity of the user of the computing device 232.

The permissions data may be obtained in a different format in additional or alternative embodiments. By way of example, the permissions data may include a text identifier, a biometric identifier (e.g., a fingerprint, a retinal scan), a one-time passcode, or any combination thereof. Indeed, the permissions data may be used with or without an authentication token. In further embodiments, the proxy device 238 may be directly coupled to the server 236 in order to receive permissions data from the server 236. For instance, the proxy device 238 may be configured to receive input information (e.g., user credentials) from the computing device 232, the proxy device 238 may transmit the input information the server 236, and the server 236 may transmit corresponding permissions data to the proxy device 238. Thus, the proxy device 238 may retrieve the permissions data from the proxy device 238 based on the input information. In any case, the permissions data may be transmitted securely, such as via an MKA connectivity association between the proxy device 238 and the computing device 232. Further still, the proxy device 238 may be configured to verify the authenticity of permissions data received from the computing device 232. As an example, the proxy device 238 may transmit data associated with the permissions data to the server 236, and the server 236 may provide information regarding the permissions data to the proxy device 238, such as via a remote dial-in user service attributes, lightweight directory access protocol object lists, open standard for authorization information objects, and the like, to verify a user identify based on the permissions data.

As mentioned above, the IEDs 234 may be communicatively coupled to the gateway 170 via a MACsec communication link. As such, by enabling data transfer between the computing device 232 and one of the IEDs 234, the proxy device 238 may enable the gateway 170 to receive encrypted data from the IED 234 and may use a corresponding SAK to decrypt the encrypted data and to transmit the decrypted data to the computing device 232. Additionally, the proxy device 238 may encrypt data received from the computing device 232 via a corresponding SAK and may transmit the encrypted data to a corresponding IED 234. In certain embodiments, the gateway 170 may also perform application-layer filtering of functions or commands and/or otherwise adjust certain data transmitted between the computing device 232 and the IED 234. By way of example, the communication link between the proxy device 238 and the computing device 232 may be based on or follow a first protocol (e.g., Secure Shell, DNP3.0), and the communication link between the proxy device 238 and the IED 234 may be based on or follow a second protocol (e.g., Telnet, Modbus TCP). Therefore, the gateway 170 (e.g., the proxy device 238) may translate the data received via the first communication link based on the first protocol into data that may be transmitted via the second communication link based on the second protocol, or vice versa.

Further, to block data transfer between the computing device 232 and one of the IEDs 234, the proxy device 238 may not communicate with the IED 234 and/or may block data (e.g., data received from the IED 234) from being transmitted to the computing device 232. Indeed, the proxy device 238 may not encrypt or decrypt data in order to block data transfer. Thus, the proxy device 238 may utilize the MACsec communication link functionality to enable and block data transfer between the computing device 232 and one of the IEDs 234.

In this manner, the proxy device 238 may directly control whether data is transmitted between the computing device 232 and the IEDs 234. As such, the IEDs 234 do not have to individually be able to receive and/or process permissions data in order to enable or block performance of certain actions. Rather, the IEDs 234 may merely be able to communicate with the gateway 170 via respective MACsec communication links, and the proxy device 238 may interact with the computing device 232 to control data transfer between the IEDs 234 and the computing device 232. As such, only the proxy device 238 may have to receive and/or process permissions data to selectively enable or block performance of actions, thereby authorizing data transfer based on permissions data. Therefore, the IEDs 234 do not have to be manufactured and/or modified to be capable of processing permissions data, and resources (e.g., memory space, processing power) of the IEDs may be utilized to maintain operational functions instead of to process permissions data. However, in additional or alternative embodiments, the techniques described herein may be implemented on the IEDs 234 to enable the IEDs 234 to process permissions data and enable or block data transmission (e.g., between the IED 234 and the computing device 232, between multiple IEDs 234) based on the permissions data. Indeed, the IED 234 may be communicatively coupled to the computing device 232, such as via an MKA connectivity association, to receive permissions data from the computing device 232, and/or the IED 234 may be communicatively coupled to the server 236 to enable the IED 234 to receive permissions data from the server 236. As such, the IEDs 234 may directly control data transmission.

Figure 4:
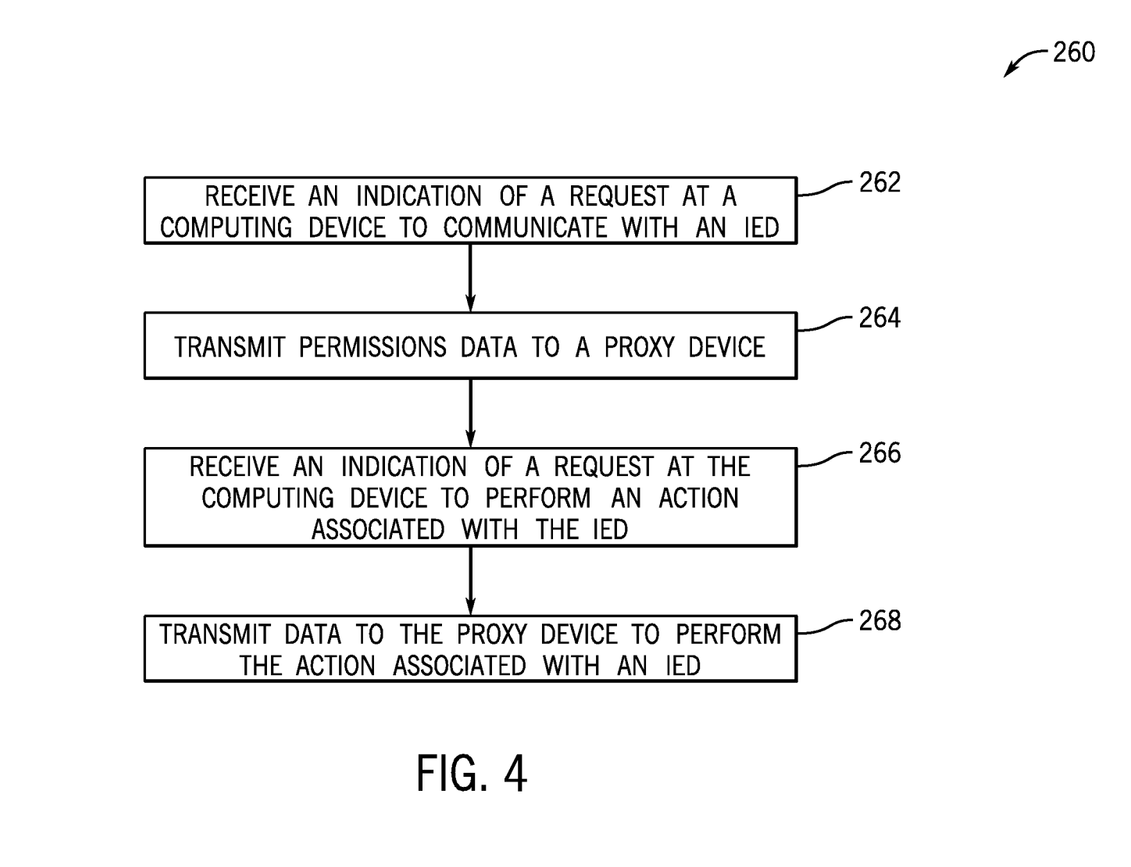
FIG. 4 is a flowchart of an embodiment of a method for communicating with a proxy device to perform an action with respect to an electric power distribution system, in accordance with an embodiment of the present disclosure.
Figure 5:
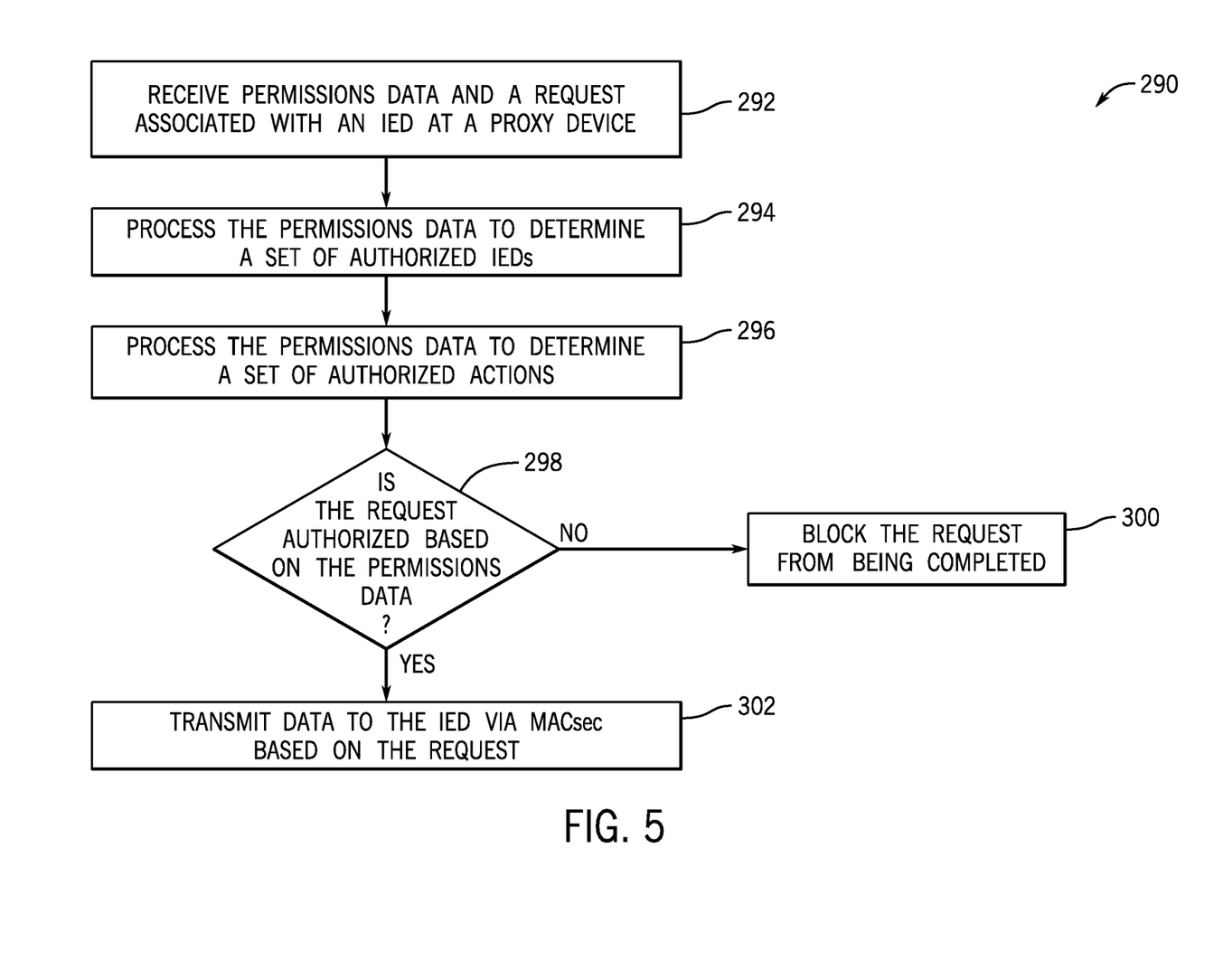
FIG. 5 is a flowchart of an embodiment of a method for enabling data transfer between a computing device and an IED of an electric power distribution system based on permissions data, in accordance with an embodiment of the present disclosure.

Each of FIGS. 4 and 5 illustrates a method associated with using permissions data to facilitate data transfer between components associated with the electric power distribution system 100. In some embodiments, each of the methods may be performed by a single respective component, such as by the computing system 200 (e.g., the processor 202) of the computing device 232 or by the computing system 200 (e.g., the processor 202) of the proxy device 238. In additional or alternative embodiments, multiple components may perform the procedures for a single one of the methods. It should also be noted that additional procedures may be performed with respect to the described methods. Additionally, certain procedures of the depicted methods may be removed, modified, and/or performed in a different order. Further still, the procedures of any of the respective methods may be performed in parallel with one another, such at the same time and/or in response to one another.

FIG. 4 is a flowchart of a method 260 for communicating with the proxy device 238 to perform an action associated with one of the IEDs 234. The method 260 is described from the perspective of the computing device 232 to perform the depicted procedures, and the method 260 may be performed prior to the proxy device 238 receiving permissions data from the computing device 232. At block 262, the computing device 232 may receive an indication of a request to communicate with the IED 234. In some embodiments, the indication may include a user input (e.g., generated based on a user interaction with the UI 206 of the computing device 232). For example, the indication may include input information (e.g., user credentials) associated with a user that may cause the computing device 232 to retrieve or generate permissions data. Indeed, the computing device 232 may transmit the input information to the server 236 to request for corresponding permissions data associated with the user. As a result, the computing device 232 may receive the permissions data from the server 236.

At block 264, the computing device 232 may transmit the permissions data to the proxy device 238. In additional or alternative embodiments, the server 236 may directly transmit permissions data to the proxy device 238, such as in response to receiving the input information from the computing device 232. As such, the computing device 232 may not directly transmit permissions data to the proxy device 238. In any case, the permissions data may cause the proxy device 238 to determine subsequent authorized actions that the user may request to be performed. For example, at block 266, the computing device 232 may receive an additional or subsequent indication of a request to perform an action associated with the IED 234. Such indication may be received as an additional user input (e.g., an additional interaction with the UI 206 of the computing device 232). The action may include a write access action in which data may be transferred to the IED 234 to cause the IED 234 to perform a target operation (e.g., to adjust a current operation, to suspend operations, to perform a requested operation). The action may additionally or alternatively include read access action in which data may be transferred to the IED 234 to retrieve certain information from the IED 234, such as operating information, product information, and the like. In response to receiving the indication of a request to perform the action, at block 268, the computing device 232 may transmit a corresponding signal or data to the proxy device 238 to effectuate the corresponding IED 234 with performing the action associated with the indication.

FIG. 5 is a flowchart of an embodiment of a method 290 for enabling data transfer between the computing device 232 and a set of IEDs 234 based on received permissions data. The method 290 is described from the perspective of the proxy device 238 to perform the depicted procedures, such as in response to procedures performed with respect to the method 260 of FIG. 4. At block 292, the proxy device 238 may receive permissions data (e.g., permissions data transmitted with via block 264 of the method 260). For example, the proxy device 238 may receive the permissions data directly from the computing device 232. Additionally or alternatively, the proxy device 238 may receive the permissions data from the server 236. By way of example, the proxy device 238 may receive input information (e.g., a token, user credentials) from the computing device 232, such as by prompting (e.g., challenging) the user via the computing device 232. The proxy device 238 may then transmit the input information to the server 236, and the proxy device 238 may receive permissions data from the server 236 based on the transmitted input information. Moreover, the proxy device 238 may receive a request (e.g., a request included in or associated with the data transmitted with via block 268 of the method 260) from the computing device 232 to perform an action associated with one of the IEDs 234, such as to instruct the IED 134 to perform a command and/or to retrieve data from the IED 134.

At block 294, the proxy device 238 may process the permissions data to determine a set of authorized IEDs that may be acted upon based on the permissions data. Further, at block 296, the proxy device 238 may process the permissions data to determine a set of authorized actions that may be performed on the determined set of authorized IEDs. Indeed, the proxy device 238 may map the permissions data to a set of allowable behavior functions that include specific actions that may be performed with respect to each IED In certain embodiments, the proxy device 238 may transmit information associated with the set of authorized IEDs and/or the set of authorized actions to the computing device 232 to inform the user of the allowable behavior functions (e.g., to encourage the user to request performance of one of the allowable behavior functions). In additional or alternative embodiments, the proxy device 238 may be configured to determine the set of authorized IEDs and/or the set of authorized actions without having to substantially process or analyze the permissions data. For instance, the proxy device 238 may transmit input information to the server 236 to enable the server 236 to determine relevant information associated with the permissions data, such as the set of authorized IEDs and/or the set of authorized actions. The server 236 may then directly transmit the relevant information to the proxy device 238 and/or the proxy device 238 may retrieve the relevant information based on the permissions data.

At block 298, the proxy device 238 may determine whether the action associated with the request received via block 292 is authorized based on the processing of the permissions data. By way of example, the proxy device 238 may compare the request with the set of authorized IEDs determined with via block 294, the set of authorized actions determined with respect to block 296, or both. That is, the proxy device 238 may determine whether the set of authorized IEDs includes the IED 234 associated with the request, and/or the proxy device 238 may determine whether the set of authorized actions includes the action associated with the request. Indeed, the proxy device 238 may determine whether the action is authorized based on the allowable behavior functions mapped to the permissions data.

At block 300, in response to determining that the action is not authorized based on the permissions data, the proxy device 238 may block the performance of the action or otherwise block the request from being completed. For example, the proxy device 238 may block data from being transferred between the computing device 232 and the IED 234. Indeed, in embodiments in which the proxy device 238 is configured to perform application-layer filtering, the proxy device 238 may use the application-layer filtering to block data from being directly transferred between the computing device 232 and the IED 234. In some embodiments, in response to determining that the action is not authorized, the proxy device 238 may transmit data to the computing device 232 to cause the computing device 232 to present a notification (e.g., an image, a message) informing the user that the action is not authorized. In additional or alternative embodiments, the proxy device 238 may transmit data to another component, such as a remote device, to inform a different user (e.g., a remote user) that an unauthorized action was requested. Thus, the other user may be notified to monitor activities associated with the electric power distribution system 100 and/or to perform an action to mitigate subsequent requests to perform unauthorized actions.

At block 302, in response to determining that the action is authorized based on the permissions data, the proxy device 238 may transmit a signal or data to the IED 234 via a corresponding MACsec communication link to perform the action or otherwise complete the request. As an example, the proxy device 238 may directly relay data received from the computing device 232 to the IED 234. As another example, the proxy device 238 may determine a target operation based on the request received from the computing device 232, generate additional data based on the target operation, and transmit the additional data to the IED 234 to cause the IED 234 to perform the action. For instance, the proxy device 238 may transmit data to the IED 234 to retrieve or request for information, the IED 234 may transmit a control signal to the proxy device 238 in response to receipt of the data from the proxy device 238, and the proxy device 238 may transmit the retrieved information to the computing device 232 in response to receipt of the control signal. As a further example, the proxy device 238 may adjust the data based on the protocol associated with the communication link between the proxy device 238 and the computing device 232 and/or between the proxy device 238 and the IED 234. In any case, the proxy device 238 may enable the computing device 232 to directly or indirectly communicate with the IED 234 in response to a determination that the action is authorized.

In some embodiments, the proxy device 238 may transmit data to indicate that the action associated with the request is authorized. In an example, the proxy device 238 may transmit data to the computing device 232 to cause the computing device 232 to display a notification to the user and confirm that the action is being performed. In another example, the proxy device 238 may transmit data to a remote computing device to indicate that an authorized action is being performed, such as to notify a remote user that the authorized action is being performed and/or to store historical information regarding actions associated with the IED 234. Indeed, such data may facilitate monitoring the operation of IED 234 and/or the electric power distribution system 100.

While specific embodiments and applications of the disclosure have been illustrated and described, it is to be noted that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system comprising:
an intelligent electronic device (IED); and
a proxy device communicatively coupled to the IED via a Media Access Control (MACsec) communication link, wherein the proxy device is configured to perform operations comprising:
receiving first permissions data;
receiving second permissions data;
receiving a first request to perform a first action associated with the IED;
determining that the first action is authorized based on the permissions data;
transmitting first data to the IED via the MACsec communication link in response to determining that the first action is authorized;
receiving a second request to perform a second action, different from the first action, associated with the IED;
determining that the second action is unauthorized based on the first permissions data;
blocking transmission of second data to the IED via the MACsec communication link in response to determining that the second action is unauthorized;
receiving a third request to perform a third action, different from the first action and the second action associated with the IED;
determining that the third action is authorized based on the second permissions data; and
transmitting third data to the IED via the MACsec communication link in response to determining that the third action is authorized.

2. The system of claim 1, wherein the proxy device is configured to perform operations comprising receiving initial data indicative of the first action and relaying the initial data to the IED via the MACsec communication link in response to determining that the first action is authorized.

3. The system of claim 1, wherein the proxy device is configured to perform operations comprising receiving the second request from a computing device and blocking transmission of the second data from the computing device to the IED in response to determining that the second action is not authorized.

4. The system of claim 1, wherein the first permissions data, the second permissions data, or a combination thereof comprises an authentication token.

5. The system of claim 1, wherein the proxy device is configured to perform operations comprising:
processing the first permissions data to determine a set of authorized IEDs; and
determining whether the set of authorized IEDs includes the IED associated with the first request.

6. The system of claim 1, wherein the proxy device is configured to perform operations comprising:
processing the second permissions data to determine a set of authorized actions; and
determining whether the set of authorized actions includes the second action associated with the second request.

7. The system of claim 1, wherein the proxy device is configured to perform operations comprising:
determining a target operation of the IED based on the first request, second request, or a combination thereof; and
transmitting the first data, the second data, or a combination thereof to the IED via the MACsec communication link to cause the IED to operate based on the target operation.

8. The system of claim 1, wherein the first action comprises retrieving information associated with the IED, and the proxy device is configured to perform operations comprising:
transmitting the first data to the IED via the MACsec communication link to retrieve the information from the IED in response to determining that the first action is authorized; and
transmitting the information retrieved from the IED.

9. A proxy device for an electric power delivery system, the proxy device comprising:
processing circuitry; and
a memory comprising instructions that, when executed by the processing circuitry, are configured to cause the processing circuitry to perform operations comprising:
receiving first permissions data associated with a first user from a first computing device;
receiving second permissions data associated with a second user from a second computing device;
receiving first data from the first computing device, wherein the first data comprises performing a first action associated with an intelligent electronic device (IED) of the electric power delivery system;
processing the first data based on the first permissions data to determine that the first action is authorized;
transmitting second data to the IED via a MACsec communication link in response to determining that the first action is authorized;
receiving third data from the second computing device, wherein the third data comprises performing a second action associated with the IED of the electric power delivery system;
processing the third data based on the second permissions data to determine that the second action is not authorized;
blocking the second action from being performed in response to determining that the second action is not authorized;
receiving fourth data from the second computing device, wherein the fourth data comprises a third action, different from the second action, associated with the IED of the electric power delivery system;
processing the fourth data based on the second permissions data to determine that the third action is authorized; and
transmitting fifth data to the IED via the MACsec communication link in response to determining that the third action is authorized.

10. The proxy device of claim 9, wherein the first action and the second action comprise the same action.

11. The proxy device of claim 9, wherein the instructions, when executed by the processing circuitry, are configured to cause the processing circuitry to perform operations comprising:
receiving sixth data from the first computing device, wherein the sixth data comprises performing a fourth action, different from the first action, associated with the IED of the electric power delivery system;
processing the sixth data based on the first permissions data to determine that the fourth action is not authorized; and
blocking transmission of seventh data to the IED in response to determining that the fourth action is not authorized.

12. The proxy device of claim 9, wherein the instructions, when executed by the processing circuitry, are configured to cause the processing circuitry to perform operations comprising transmitting an indication that the second action is not authorized to the second computing device in response to determining that the second action is not authorized.

13. The proxy device of claim 9, wherein the instructions, when executed by the processing circuitry, are configured to cause the processing circuitry to perform operations comprising transmitting an indication that the first action is being performed to the first computing device in response to determining that the first action is authorized.

14. The proxy device of claim 9, wherein the instructions, when executed by the processing circuitry, are configured to cause the processing circuitry to perform operations comprising:
    processing the first permissions data to determine a first set of authorized IEDs, a first set of authorized actions, or both; and
    processing the second permissions data to determine a second set of authorized IEDs, a second set of authorized actions, or both.

15. The proxy device of claim 14, wherein the instructions, when executed by the processing circuitry, are configured to cause the processing circuitry to perform operations comprising:
    processing the first data based on the first permissions data by comparing the first data with the first set of authorized IEDs, the first set of authorized actions, or both; and
    processing the third data based on the second permissions data by comparing the third data with the second set of authorized IEDs, the second set of authorized actions, or both.

16. A system comprising:
    a plurality of intelligent electronic devices (IEDs); and
    a proxy device communicatively coupled to each IED of the plurality of IEDs via a respective Media Access Control (MACsec) communication link, wherein the proxy device is configured to perform operations comprising:
        receiving first permissions data;
        receiving second permissions data;
        processing the first permissions data to map a first plurality of allowable behavior functions to the first permissions data;
        processing the second permissions data to map a second plurality of allowable behavior functions to the second permissions data;
        receiving a first request to perform a first action associated with an IED of the plurality of IEDs;
        determining that the first action is authorized based on the first plurality of allowable behavior functions mapped to the first permissions data;
        transmitting first data to the IED via a corresponding MACsec communication link in response to determining that the first action is authorized;
        receiving a second request to perform a second action, different from the first action, associated with the IED;
        determining that the second action is unauthorized based on the second plurality of allowable behavior functions mapped to the second permissions data;
        blocking transmission of second data to the IED via the corresponding MACsec communication link in response to determining that the second action is unauthorized;
        receiving a third request to perform a third action, different from the first action, the second action, or a combination thereof, associated with the IED;
        determining that the third action is authorized based on the second plurality of allowable behavior functions mapped to the second permissions data; and
        transmitting third data to the IED via a corresponding MACsec communication link in response to determining that the third action is authorized.

17. The system of claim 16, wherein the plurality of allowable behavior functions and the second plurality of allowable behavior functions comprise a respective set of authorized actions associated with each IED of the plurality of IEDs.

18. The system of claim 16, comprising a server configured to generate the first permissions data and second permissions data to be received by the proxy device.

19. The system of claim 18, wherein the server is configured to perform operations comprising:
    receiving first user credentials and second user credentials;
    generating the first permissions data based on the first user credentials; and
    generating the second permissions data based on the second user credentials.

20. The system of claim 16, wherein the proxy device is configured to transmit data between a set of IEDs of the plurality of IEDs.

* * * * *